United States Patent
Baby et al.

(10) Patent No.: US 11,279,114 B2
(45) Date of Patent: Mar. 22, 2022

(54) LAYERED BENDABLE PUNCTURE RESISTANT GLASS ARTICLE AND METHOD OF MAKING

(71) Applicant: Corning Incorporated, Corning, NY (US)

(72) Inventors: Shinu Baby, Painted Post, NY (US); Dana Craig Bookbinder, Corning, NY (US); Polly Wanda Chu, Painted Post, NY (US); Timothy Michael Gross, Corning, NY (US); Yousef Kayed Qaroush, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 16/346,304

(22) PCT Filed: Oct. 27, 2017

(86) PCT No.: PCT/US2017/058648
§ 371 (c)(1),
(2) Date: Apr. 30, 2019

(87) PCT Pub. No.: WO2018/081489
PCT Pub. Date: May 3, 2018

(65) Prior Publication Data
US 2019/0315099 A1    Oct. 17, 2019

Related U.S. Application Data (60) Provisional application No. 62/415,225, filed on Oct. 31, 2016.

(51) Int. Cl.
*B32B 17/06*    (2006.01)
*B32B 7/12*     (2006.01)
(Continued)

(52) U.S. Cl.
CPC ............. *B32B 17/06* (2013.01); *B32B 3/08* (2013.01); *B32B 7/12* (2013.01); *C03C 17/32* (2013.01);
(Continued)

(58) Field of Classification Search
CPC .......... B32B 17/00; B32B 17/06–1099; C03C 17/28–328; G02F 1/133305;
(Continued)

(56) References Cited

U.S. PATENT DOCUMENTS 6,699,605 B2    3/2004    Umayahara et al.
6,829,114 B2    12/2004   Sakamoto
(Continued)

FOREIGN PATENT DOCUMENTS

DE    102011106537 A1    1/2013
KR    10-2009-0082217 A    7/2009
(Continued)

OTHER PUBLICATIONS

International Search Report and Written Opinion of the International Searching Authority; PCT/US2017/058648; dated Mar. 16, 2018; 11 Pages; European Patent Office.
(Continued)

*Primary Examiner* — Z. Jim Yang
(74) *Attorney, Agent, or Firm* — Jeffrey A. Schmidt (57) ABSTRACT

A glass article having a first glass layer, a second glass layer disposed adjacent to the first glass layer, and an interface slidably coupling the first glass layer to the second glass layer. The interface has a thickness of from 2 nm to 500 nm. The glass article is characterized by: (a) an absence of failure when the article is held at a parallel plate separation distance of 10 mm for 60 minutes at 25° C. and 50% relative humidity; (b) a puncture resistance of greater than about 6 kgf when the second glass layer is supported by (i) a 50 μm
(Continued)

thick pressure-sensitive adhesive having an elastic modulus of less than 1 GPa and (ii) an approximately 100 μm thick polyethylene terephthalate layer having an elastic modulus of less than 10 GPa, and the first glass layer is loaded with a tungsten carbide ball having a 1 mm diameter.

9 Claims, 4 Drawing Sheets

(51) Int. Cl.
| | | |
|---|---|---|
| *C03C 17/32* | (2006.01) | |
| *C03C 27/10* | (2006.01) | |
| *B32B 3/08* | (2006.01) | |
| *G06F 1/16* | (2006.01) | |
| *H04M 1/02* | (2006.01) | |
| *G02F 1/1333* | (2006.01) | |

(52) U.S. Cl.
CPC .......... *C03C 27/10* (2013.01); *B32B 2255/26* (2013.01); *B32B 2307/546* (2013.01); *B32B 2307/581* (2013.01); *B32B 2315/08* (2013.01); *B32B 2379/08* (2013.01); *B32B 2457/20* (2013.01); *G02F 1/133305* (2013.01); *G06F 1/1652* (2013.01); *H04M 1/0268* (2013.01)

(58) Field of Classification Search
CPC ......... G02F 2203/04102; G06F 1/1652; G09F 9/301; H01L 51/0097; H01L 2251/5338
See application file for complete search history.

(56) References Cited

U.S. PATENT DOCUMENTS

| | | | |
|---|---|---|---|
| 7,812,530 B2 | 10/2010 | Handa et al. | |
| 8,982,545 B2 | 3/2015 | Kim et al. | |
| 9,050,780 B2 | 6/2015 | Aoshima et al. | |
| 9,101,061 B2 | 8/2015 | Aoshima et al. | |
| 9,321,677 B2 | 4/2016 | Chang et al. | |
| 9,321,678 B2 | 4/2016 | Chang et al. | |
| 9,321,679 B2 | 4/2016 | Chang et al. | |
| 10,020,462 B1* | 7/2018 | Ai | H01L 51/524 |
| 10,824,200 B2 | 11/2020 | Chang et al. | |
| 2003/0214612 A1* | 11/2003 | Freeman | B32B 27/365 |
| | | | 349/12 |
| 2010/0028585 A1 | 2/2010 | Shimatani | |
| 2010/0101649 A1 | 4/2010 | Huignard et al. | |
| 2010/0151210 A1 | 6/2010 | Shimatani | |
| 2010/0209648 A1 | 8/2010 | Shimatani et al. | |
| 2012/0320509 A1* | 12/2012 | Kim | B32B 17/10 |
| | | | 361/679.01 |
| 2013/0010405 A1* | 1/2013 | Rothkopf | H05K 5/0226 |
| | | | 361/679.01 |
| 2013/0112459 A1 | 5/2013 | Aoshima et al. | |
| 2013/0180760 A1 | 7/2013 | Aoshima et al. | |
| 2013/0224407 A1* | 8/2013 | Fadeev | C03C 17/42 |
| | | | 428/34.7 |
| 2014/0295150 A1* | 10/2014 | Bower | B32B 15/085 |
| | | | 428/201 |
| 2014/0355195 A1* | 12/2014 | Kee | H04M 1/0268 |
| | | | 361/679.27 |
| 2015/0099110 A1 | 4/2015 | Bellman et al. | |
| 2015/0122406 A1 | 5/2015 | Fisher et al. | |
| 2015/0210588 A1* | 7/2015 | Chang | C03C 15/00 |
| | | | 361/750 |
| 2015/0210589 A1* | 7/2015 | Chang | B32B 37/16 |
| | | | 428/220 |
| 2015/0336357 A1 | 11/2015 | Kang et al. | |
| 2016/0009068 A1 | 1/2016 | Garner | |
| 2016/0204164 A1 | 7/2016 | Zhao et al. | |
| 2016/0224066 A1* | 8/2016 | Hussa | H04M 1/0268 |
| 2016/0226015 A1* | 8/2016 | Kauhaniemi | H01L 51/5246 |
| 2017/0092892 A1* | 3/2017 | Zhang | H01L 51/5253 |
| 2017/0303423 A1* | 10/2017 | Cavallaro | G02F 1/133308 |
| 2018/0009197 A1 | 1/2018 | Gross et al. | |
| 2019/0011954 A1* | 1/2019 | Chu | B32B 17/06 |
| 2019/0140199 A1* | 5/2019 | Senoo | H01L 51/524 |

FOREIGN PATENT DOCUMENTS

| | | |
|---|---|---|
| KR | 10-2016-0061326 A | 5/2016 |
| KR | 10-2016-0066039 A | 6/2016 |
| TW | 201412554 A | 4/2014 |
| WO | 2012157616 A1 | 11/2012 |
| WO | 2012157617 A1 | 11/2012 |
| WO | 2013/184904 A1 | 12/2013 |
| WO | 2015/054098 A1 | 4/2015 |
| WO | 2016/073551 A1 | 5/2016 |
| WO | 2016/115126 A1 | 7/2016 |

OTHER PUBLICATIONS

Tada et al.; "The Stress Analysis of Cracks Handbook: Third Edition"; 2000: ASME Press; pp. 2-5 "Crack-Tip Stress Fields for Linear-Elastic Bodies"; pp. 581-582 "Introduction and Linear-Elastic Solutions"; pp. 629-630 "The Complete Analytical Solution for Small-Scale Yielding".

Yalikun et al.; "An All-Glass 12 um Ultra-Thin and Flexible Micro-Fluidic Chip Fabricated By Femtosecond Laser Processing"; Lab on a Chip, 2016, 16; pp. 2427-2433.

Korean Patent Application No. 10-2019-7015602, Office Action dated Feb. 4, 2021, 14 pages (8 page of English Translation and 6 pages of Original Document); Korean Patent Office.

Taiwanese Patent Application No. 106136862, Office Action dated Nov. 16, 2021, 4 pages (English Translation Only); Taiwanese Patent Office.

* cited by examiner

LAYERED BENDABLE PUNCTURE RESISTANT GLASS ARTICLE AND METHOD OF MAKING

CROSS-REFERENCE TO RELATED APPLICATIONS

This application is a national stage entry of International Patent Application Serial No. PCT/US2017/058648, filed on Oct. 27, 2017, which in turn, claims the benefit of priority under 35 U.S.C. § 119 of U.S. Provisional Application Serial No. 62/415,225 filed on Oct. 31, 2016, the contents of each of which are relied upon and incorporated herein by reference in their entireties.

BACKGROUND

Field

The present disclosure relates generally to bendable glass articles and methods of making them.

Technical Background

Flexible versions of products and components that are traditionally rigid in nature are being conceptualized for new applications. For example, flexible electronic devices can provide thin, lightweight and flexible properties that offer opportunities for new applications, for example curved displays and wearable devices. Many of these flexible electronic devices require flexible substrates for holding and mounting the electronic components of these devices. Metal foils have some advantages including thermal stability and chemical resistance, but suffer from high cost and a lack of optical transparency. Polymeric foils have some advantages including resistance to fatigue failure, but suffer from marginal optical transparency, lack of thermal stability and limited hermeticity.

Some of these electronic devices also can make use of flexible displays. Optical transparency and thermal stability are often important properties for flexible display applications. In addition, flexible displays should have high fatigue and puncture resistance, including resistance to failure at small bend radii, particularly for flexible displays that have touch screen functionality and/or can be folded.

Conventional flexible glass materials offer many of the needed properties for flexible substrate and/or display applications. However, efforts to harness glass materials for these applications have been somewhat unsuccessful to date. Generally, glass substrates can be manufactured to very low thickness levels (<25 μm) to achieve smaller and smaller bend radii. These "thin" glass substrates suffer from limited puncture resistance. At the same time, thicker glass substrates (>150 μm) can be fabricated with better puncture resistance, but these substrates lack suitable fatigue resistance and mechanical reliability upon bending.

Thus, there is a need for glass materials, components and assemblies for reliable use in flexible substrate and/or display applications and functions, particularly for flexible electronic device applications.

SUMMARY

A glass article constructed of a stack of ultra-thin glass layers that can be bent to tight radius like single ultra-thin glass layers, but that has puncture resistance like a thicker monolithic piece of glass. As used herein the term "ultra-thin" glass layers means glass layers each having a thickness of from about 25 micrometers (hereinafter "microns" or "μm") to about 100 microns. The glass article can be a cover glass for a foldable display stack containing Thin Film Transistor (TFT) backplane and Organic Light Emitting Diode (OLED) devices, for example.

The present disclosure provides embodiments of a layered glass article ("stack") of ultra-thin glass layers that mimic a monolithic layer of thick glass in terms of structural integrity (puncture resistance), but that mimic an ultra-thin glass sheet in that it is capable of bending to a tight radius while still providing a pencil hardness of greater than or equal to 8H on the user-facing side of the cover element. Anti-frictive coatings and/or materials between the ultra-thin glass layers allow the ultra-thin glass layers to slide past each other during bending (similar to the manner in which one can bend a thick soft-cover book about an axis parallel to the binding). The glass layers re-align when in a non-bent configuration due to a connection between them as, for example, a permanent edge seal on one edge or due to constraints from a frame by which the stack is held within a device.

Compared to a single ultra-thin glass layer, embodiments of the present disclosure may have the puncture resistance of a thicker monolithic piece of glass.

Compared to a monolithic piece of glass of similar thickness to the total thickness of the glass from all ultra-thin layers in the stack, some embodiments of the present disclosure achieve a tighter bend radius, approaching one similar to that as can be achieved by a single layer of ultra-thin glass.

Compared to plastic only, or plastic as the customer facing cover surface on a consumer electronic device, the glass articles according to some embodiments of the present disclosure have: enhanced surface hardness of greater than or equal to 8H, for example greater than or equal to 9H, pencil hardness which resists abrasion; higher transmission; higher chemical durability; and higher resistance to warp with bend.

The accompanying drawings are included to provide a further understanding of the principles described, and are incorporated in and constitute a part of this specification. The drawings illustrate one or more embodiment(s), and together with the description serve to explain, by way of example, principles and operation of those embodiments. It is to be understood that various features disclosed in this specification and in the drawings can be used in any and all combinations.

The embodiments, and the features of those embodiments, as discussed herein are exemplary and can be provided alone or in any combination with any one or more features of other embodiments provided herein without departing from the scope of the disclosure. Moreover, it is to be understood that both the foregoing general description and the following detailed description present embodiments of the disclosure, and are intended to provide an overview or framework for understanding the nature and character of the embodiments as they are described and claimed. The accompanying drawings are included to provide a further understanding of the embodiments, and are incorporated into and constitute a part of this specification. The drawings illustrate various embodiments of the disclosure, and together with the description, serve to explain the principles and operations thereof.

DETAILED DESCRIPTION

In the following detailed description, for purposes of explanation and not limitation, example embodiments disclosing specific details are set forth to provide a thorough understanding of various principles and aspects. However, it will be apparent to one having ordinary skill in the art, having had the benefit of the present disclosure, that the claimed subject matter may be practiced in other embodiments that depart from the specific details disclosed herein. Moreover, descriptions of well-known devices, methods and materials may be omitted so as not to obscure the description of various principles set forth herein. Finally, wherever applicable, like reference numerals refer to like elements.

Methods and apparatus will now be described more fully hereinafter with reference to the accompanying drawings in which exemplary embodiments of the disclosure are shown. Whenever possible, the same reference numerals are used throughout the drawings to refer to the same or like parts. However, this disclosure may be embodied in many different forms and should not be construed as limited to the embodiments set forth herein.

According to some embodiments, layered glass articles ("stacks") may be used as a cover element for an electronic device. Embodiments of the layered glass stacks herein will be described as cover elements in electronic devices, but such need not be the case. The bendable glass stacks can be used in any environment wherein it is beneficial for the material to have any one or more of: bendability to a small radius; puncture resistance; hermeticity; and/or scratch resistance, for example pencil hardness of greater than or equal to 8H, or greater than or equal to 9H.

Figure 1:
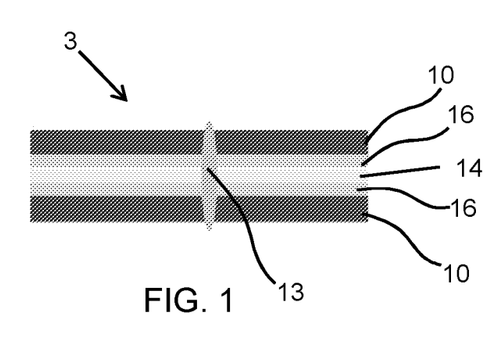
FIG. 1 is a schematic side view of a stack, in an unbent configuration, according to some embodiments.
Figure 2:
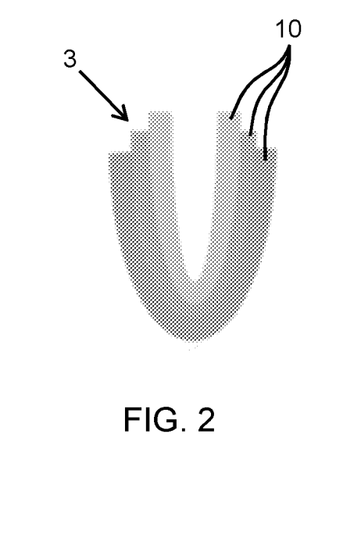
FIG. 2 is a schematic side view of a stack, in a bent configuration, according to some embodiments.

As shown in FIG. 1 a stack 3 includes two or more glass layers 10 that are disposed adjacent to one another across an interface 12. The glass layers 10 are decoupled (i.e., are not bonded to one another across their entire areas or around their entire peripheries), from one another and, thus, are allowed to slide relative to one another. It is because the glass layers 10 can slide with respect to one another that the stack is able to bend to a tight radius. That is, as shown in FIG. 2, a stack of three glass layers 10, when bent, slide relative to one another and, thus, the stress induced into one of the glass layers 10 is largely independent of that induced in an adjacent glass layer 10. In FIG. 2 is seen that the glass layer 10 on the side of the center of curvature is bent to the smallest radius of curvature, with successive glass layers being bent to larger and larger radii of curvature when traveling outward along the radius of curvature of the stack 3. Accordingly, the glass layers at larger radii of curvature have less bend-induced stress than those closest the center of curvature of the stack 3 when bent. Also, the inner-most glass layer will extend beyond the perimeter of the next adjacent glass layer 10, and so on along the radius of curvature. In any event, because the glass layers 10 are decoupled from one another the stress induced in one glass layer 10 is largely independent of that in adjacent glass layers. When the stack 3 is unbent, the glass layers 10 again slide relative to one another and return to their substantially flat states. In order to keep the glass layers aligned with respect to one another, they may be tacked together as shown schematically at 13. The glass layers 10 may be tacked by an adhesive, clamp, tape, fastener, or other suitable material or device to pin (tack, or otherwise hold fast or fix relative to one another) the glass layers 10 together at a point, preferably at the edge of the layers, and preferably along an axis around which the stack 3 is bent. In practice, it is beneficial to tack the layers together, so they are fixed relative to one another, at the portion which also includes the hinge axis about which the layers are bent during the bending, folding, or rolling, of the electronic device of which the stack 3 is a part. Alternatively, or in addition, a frame element (not shown, but which may be disposed around, over, and/or under, portions of the stack 3), may restrain the movement of portions of the glass layers 10 to maintain them in a suitably aligned manner. The challenges with this approach are to get enough coupling between the layers so that there is enough of a transfer/absorption of energy from one glass layer to the next to increase puncture resistance, while at the same time maintaining enough decoupling and anti-frictive sliding of the layers relative to one another to prevent frictive damage to one or more of the layers by the sliding. Accordingly, it is beneficial to prevent direct contact between adjacent glass layers. However, even if the layers are not in direct contact, foreign particles between the layers may cause damage upon the sliding of one glass layer relative to another. Thus, lubricity and cleanliness between the glass layers are beneficial to prevent frictive damage to the glass layers.

Glass layers 10 each may be from 10 microns to 125 microns thick, for example 10 microns, 20 microns, 30 microns, 40 microns, 50 microns, 60 microns, 70 microns, 80 microns 90 microns, 100 microns, 110 microns, 120 microns, 125 microns, and sub-ranges between the foregoing values. The layers 10 in any stack 3 may have the same thickness, or may have different thicknesses. For example, in some instances, it may be desirable to have a thicker glass layer (for example 100 microns thick, or 110 microns thick, or 120 microns thick, or 125 microns thick) as the topmost layer because a topmost layer having thinner thickness (for example 50 microns thick or less) may puncture easier than a thicker layer, all other things being equal. Such phenomena is likely do to the real-world considerations that cause the interface 12 to not perfectly transfer energy between glass layers. Also, in some instances, it may be preferable to have a smaller number of thicker layers than a larger number of thinner layers to achieve the same overall amount of glass thickness in the stack. For example, for a desired glass thickness of 200 microns, it may in some instances, be preferable to use two layers of 100 micron thick glass than to use 4 layers of 50 micron thick glass. The glass layers 10 each may be made of an alkali-free or alkali-containing aluminosilicate, borosilicate, boroaluminosilicate, or silicate glass composition. For example, glass layers 10 may be made of alkali-free aluminosilicate, borosilicate, boroaluminosilicate, and silicate glass compositions. Glass layers 10 can also be fabricated from alkali-containing aluminosilicate, borosilicate, boroaluminosilicate, and silicate glass compositions. In certain embodiments, alkaline earth modifiers can be added to any of the foregoing compositions for glass layers 10. Glass layer 10 may be formed of glass, a glass ceramic, a ceramic material or composites thereof. The layers 10 in any stack 3 may be made of the same or of a different material as the other layers 10 in the stack 3. There may be any suitable number of glass layers 10 used in any given stack 3. For example, there may be used 2, 3, 4, 5, 6, 7, 8, 9, 10, 11, 12, or more glass layers 10 in a stack. The number of glass layers may depend upon, among other considerations, the desired puncture resistance and the thickness of each layer.

The interface 12 may include any one or more of material 14 and coating 16. The material 14 is generally used in the interface 12 to minimize the amount of material therein that has a refractive index different from that of the glass layers 10. For example, when the glass layers 10 have a different refractive index than air, material 14 is disposed in the interface 12 to minimize the amount of air therein, because the differences in index of refraction may cause newton rings, reflections, or other undesirable optical effects to be present when the stack is viewed. Further, it is desirable for material 14 to be optically clear so that a display disposed under the stack 3 can be clearly viewed. Material 14 may include index matching oil (such as mineral oil or gel) or air gap. Coating 16 may be present on one glass layer 10, both glass layers 10, or neither glass layer 10 disposed across any particular interface. When present the coating 16 may include anti-frictive properties to assist adjacent glass layers 10 sliding relative to one another without causing damage to one another. The coating 16 may include: fluorocarbon materials are known for their low surface energy, including thermoplastics such as polytetrafluoroethylene (PTFE), FEP, PVDF and amorphous fluorocarbons (including Teflon AF (DuPont), Cytop (Asahi) which typically rely on mechanical interlocking mechanisms for adhesion or silanes such as DC2634 (Dow Corning) or other fluoro or perfluorosilanes (or alkylsilanes) which can be deposited as a monolayer or multilayer (cure at 50-80 C, 50 RH); silicone resins, waxes, polyethylene (oxidized) used by themselves or in conjunction with a hot end coating, such as tin oxide (improved adhesion and reduction of surface contact area), or vapor deposited coatings such as parylene and DLC (diamond-like coating) can also be used to provide low friction, hydrophobic coatings; low friction coatings can also be achieved using zinc oxide, molybdenum (or tungsten) disulfide, hexagonal boron nitride, or aluminum magnesium boride can be used either alone or as additives to a binder; other coatings such as polyimides, polyesters or polyacrylates could also be applied to one or more of the glass layers. The coating 16 may be a few nanometers (nm) thick, for example, 2 nm, 3 nm, 4 nm, 5 nm, 6 nm, 7 nm, 8 nm, 9 nm, 10 nm, 12 nm, 15 nm, 20 nm, and all ranges and sub-ranges between the foregoing values. When the coating 16 is not present on either glass layer across an interface 12, the interface 12 may include material 14 that has index of refraction matching characteristics as well as anti-frictive characteristics. For example, the thickness of the interface 12 can be about 5 microns or less, for example, 4.5 microns, 4.0 microns, 3.5 microns, 3.0 microns, 2.5 microns, 2.0 microns, 1.5 microns, 1.0 microns, 0.5 microns, and all ranges and sub-ranges between the foregoing values. On the other hand, to provide sufficient lubricity between the layers so that they may slide on one another, the interface should be at least on the order of a few nm thick, for example, 2 nm, 3 nm, 4 nm, 5 nm, 6 nm, 7 nm, 8 nm, 9 nm, 10 nm, 11 nm, 12 nm, 15 nm, 20 nm, and all ranges and sub-ranges between the foregoing values.

One reason for thin glass puncture resistance fracture is biaxial failure on the bottom surface of glass, particularly when there is a soft material underlying the glass. Thicker glass has higher puncture failure height, with failure at the top surface, but is difficult or unable to bend to the desired tight radius.

The characteristics of the stack 3 (including: thickness and number of glass layers 10; thickness of interface 12; presence, material, and thickness of material 14; and presence and material of coating(s) 16) are chosen to provide the stack with suitable bendability to a desired bend radius as well as a suitable puncture resistance. According to some embodiments, because the stress in the glass layer 10 varies as the cube of the glass layer 10 thickness, the thickness of each glass layer 10 may be chosen small enough to withstand the desired bend radius for the stack 3, i.e., a thickness less than or equal to 125 microns, for example 120 microns, 110 microns, 100 microns, 90 microns, 80 microns, 70 microns, 60 microns, 50 microns, 40 microns, 30 microns, 20 microns, 10 microns, and all ranges and sub-ranges between the foregoing values. Then, to provide the stack with suitable puncture resistance, for example, puncture resistance approaching a thick glass layer, i.e., thickness of 150 microns or more, for example 160 microns, 170 microns, 180 microns, 190 microns, 200 microns, 210 microns, 220 microns, 230 microns, 240 microns, or 250 microns, and all ranges and sub-ranges between the foregoing values, a number of thinner layers are stacked atop one another as described above, with an interface between the layers.

Figure 7:
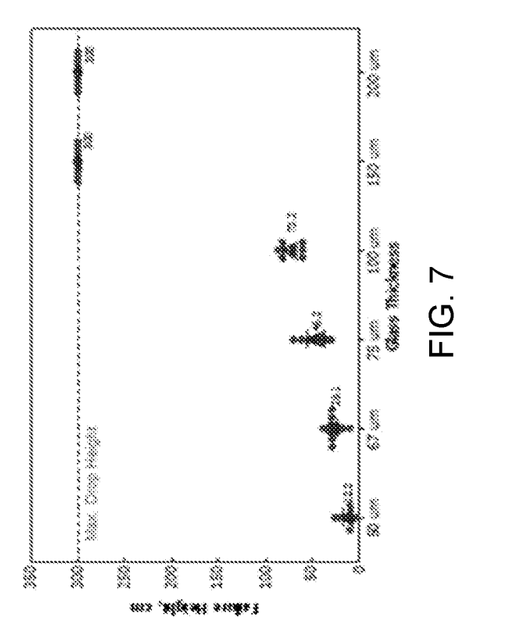
FIG. 7 is a plot of experimental results for pen drop testing including failure height (vertical axis in cm) versus glass thickness (horizontal axis in micrometers (hereinafter microns or μm).

FIG. 7 shows pen drop testing on various thicknesses of monolithic pieces of glass. The pen drop test was conducted as follows: test samples were taped on the bottom with a piece of 3M 471, 0.14 mm adhesive tape to contain fracture pieces; the samples were then placed with the tape side down on top of a 5 mm thick ABS/PVC plate which, in turn, was placed on top of a 26 mm thick Epoxyn Support; the pen used was a 0.8 mm ball, Flex Grip Elite M, by Paper Mate®, weighing 6.45 g, the pen was changed every 5 drops and for each different sample; 10 specimens were tested per thickness per pen, except 16 samples were tested for 67 micron thick glass, and 3 specimens each were tested for 150 micron and 200 micron thick glass; a tube was arranged substantially perpendicularly to the major surface of the glass sample, and was used to guide the pen to the sample; the height of the pen was controlled by a stop pin, and started at 2 cm above the sample; if the sample passed a particular pen drop height, the tube was moved to guide the next pen drop to a different point on the sample major face, and the height increased by 2 cm until glass failure by cracking; the maximum test height was found to be less than 90 cm for 50 to 100 micron thick glass, as per FIG. 7; for 150 and 200 micron thick glass samples, after having passed pen drop heights of 90 cm, each sample was subject to 3 drops at each 150 cm and 300 cm, and no failure was found to occur; a maximum drop height of 300 cm was recorded, and the test ended without failure of the samples. As seen from FIG. 7, thicker pieces of glass (for example 150 microns and 200 microns) have much greater puncture resistance than 100 micron and thinner pieces of glass. However, as is known in the art, because glass stiffness increases as the cube of its thickness in a non-linear manner, thinner pieces of glass (for example 125 microns and less) can achieve a much smaller bend radius than can be achieved by thicker pieces of glass (for example 200 microns and greater). Accordingly, it would be beneficial for a glass article to achieve a puncture resistance similar to a 200 micron thick (or thicker) piece of glass, while also maintaining the bendability of a 125 micron thick (or thinner) piece of glass.

Thus, various configurations of stacks 3 were designed to maintain bendability to a desired tight bend radius (for example, that of a 100 micron thick monolithic piece of glass, wherein the glass was prepared by etching, ion-exchanging, and etching as described in U.S. Pat. No. 9,321,677 and available from Corning Incorporated, Corning, N.Y.), while achieving a suitable puncture resistance, for example a puncture resistance approaching that similar to a 200 micron thick monolithic piece of glass.

Figures 3A, 3E:
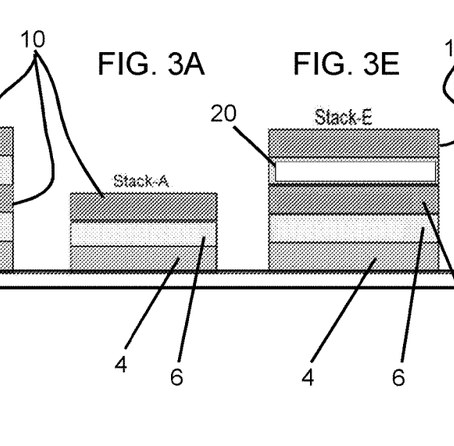
FIGS. 3A to 3F are schematic side views of various stacks according to some embodiments.
Figure 3G:
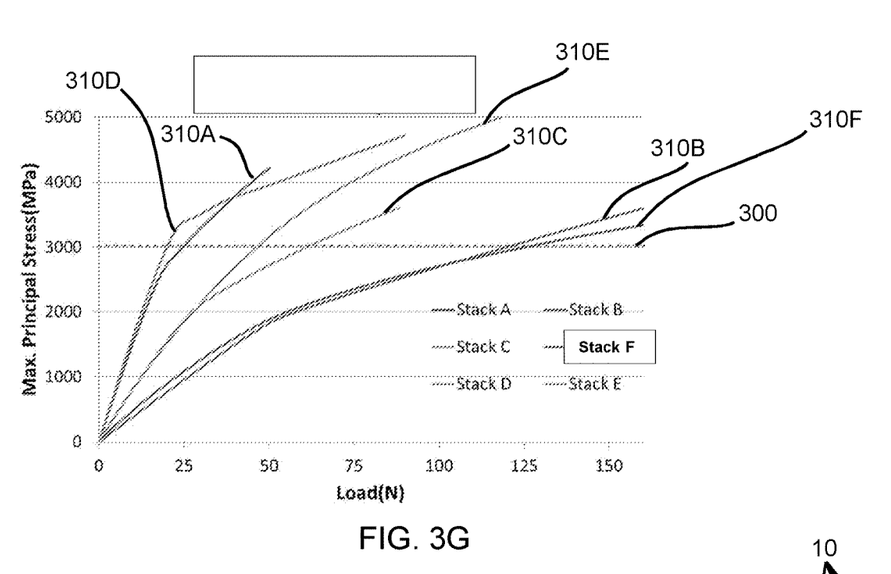
FIG. 3G is a plot of modeled results for puncture resistance testing using the test set-up of FIG. 1, and includes maximum principal stress (on the vertical axis in MPa) versus load (horizontal axis in N).
Figure 4:
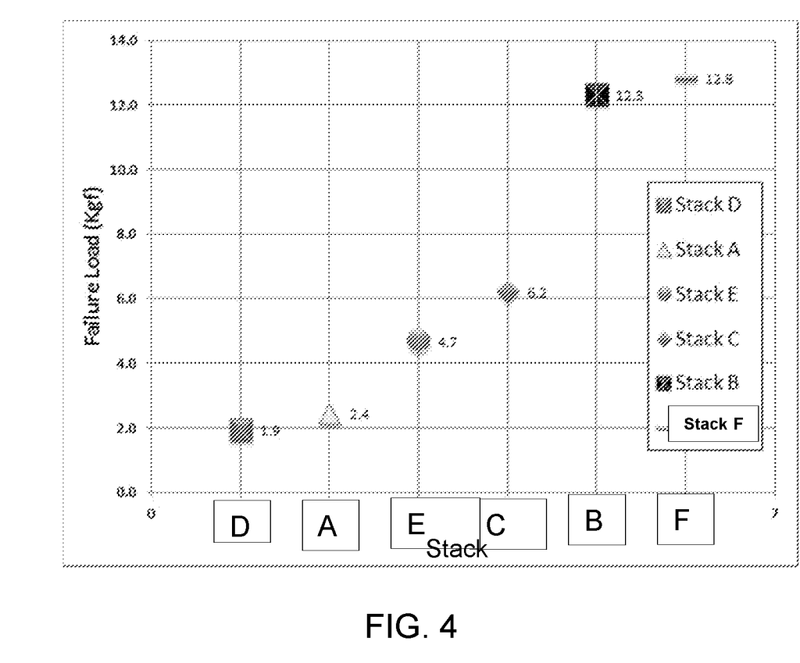
FIG. 4 is a plot of modeled results for threshold puncture load (on vertical axis in Kgf) for each of the modeled stack configurations A-F.

Stack A is shown in FIG. 3A and includes a 100 micron thick glass layer 10. As will be described below in connection with the testing apparatus of FIG. 5, the stacks were modeled and tested with underlying materials chosen to mimic the performance of the device underlying the stack 3. Particularly, the underlying materials common to all the stacks (Stacks A-F) are a solid aluminum stage 2, on top of which there is disposed a 100 micron thick layer of polyethylene terapthalate (PET) 4, on top of which there is disposed a 50 micron thick layer of either optically clear adhesive (OCA) or pressure sensitive adhesive (PSA) 6. The stack 3 is then disposed on top of the 50 micron layer of OCA or PSA. The properties of the materials in the stacks 3 are as shown below in Table 1. Similarly to the test results of FIGS. 5 and 6, the modeling of FIGS. 3 and 4 employed a load applied by a 1 mm diameter tungsten-carbide ball. In the multilayer stacks, the layers (other than the OCA/PSA layers, and layers adjacent thereto) were modeled as not directly "hard" bonded to each other across entire surface, but so as to allow sliding when bent. Even regarding the OCA/PSA layers, they were modeled as sliding relative to one another, even though they are adhesive, because they have a low enough stiffness to allow movement of the layers relative to one another in a shear direction. The glass was modeled has having been ion-exchanged so as to achieve a compressive stress of about 850 MPa at each of its surfaces wherein the compressive stress had a depth of compression of about 10 to 15 microns (wherein depth of compression is defined as the point at which the stress changes from compressive to tensile. The modeling assumed a failure when the maximum principal stress at the underside of the top glass layer achieved a value of substantially 3000 MPa—see dashed line 300 in FIG. 3G. This number was used consistently for all samples, however, in reality, this number may be shifted up or down depending on various factors including glass composition and strengthening. Then, FIG. 4 shows the modeled results in FIG. 3G (for the stacks of FIGS. 3A-F) having failure load converted into Kgf. As shown in FIG. 3G, Stack A is modeled to achieve a load of about 24 N at failure; and as shown in FIG. 4, this corresponds to a load of about 2.4 Kgf.

Figures 3B, 3F:
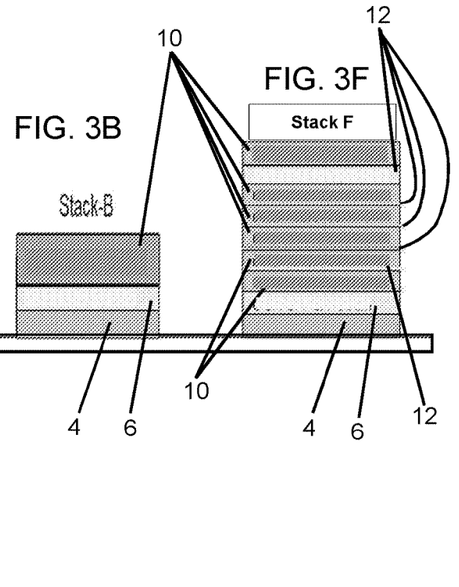

Stack B is shown in FIG. 3B and includes a 200 micron thick glass layer 10. As shown in FIG. 3G, Stack B is modeled to achieve a load of about 123 N at failure; and as shown in FIG. 4, this corresponds to a load of about 12.3 Kgf.

Figure 3C:
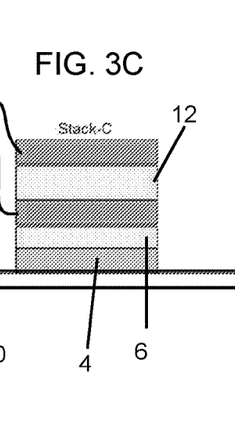

Stack C is shown in FIG. 3C and includes two 100 micron thick glass layers 10 disposed across an interface 12. The interface 12 includes a coating 16 on each glass layer and a material 14 therebetween. The thickness of the interface 12 was about 50 nm. As shown in FIG. 3G, Stack C is modeled to achieve a load of about 62N at failure; and as shown in FIG. 4, this corresponds to a load of about 6.2 Kgf.

Figure 3D:
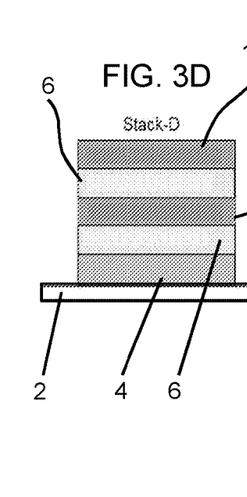

Stack D is shown in FIG. 3D and includes two 100 micron thick glass layers 10 with a 50 micron OCA or PSA layer therebetween. As shown in FIG. 3G, Stack D is modeled to achieve a load of about 19 N at failure; and as shown in FIG. 4, this corresponds to a load of about 1.9 Kgf.

Stack E is shown in FIG. 3E and includes two 100 micron thick glass layers 10 with a 50 micron polyimide (PI) layer therebetween. This stack was modeled as having the PI layer decoupled from the adjacent glass layers, i.e., not adhered thereto. As shown in FIG. 3G, Stack E is modeled to achieve a load of about 47 N at failure; and as shown in FIG. 4, this corresponds to a load of about 4.7 Kgf.

Stack F is shown in FIG. 3F and includes six 100 micron thick glass layers 10 disposed across interfaces 12 between adjacent pairs of glass layers. Each interface 12 includes a coating 16 on each glass layer and a material 14 therebetween. The thickness of each interface 12 was about 50 nm. As shown in FIG. 3G, Stack F is modeled to achieve a load of about 128 N at failure; and as shown in FIG. 4, this corresponds to a load of about 12.8 Kgf.

In general, it is seen that the underlying layer(s) of glass limit the localized bending of the top glass from point loads, thus increasing the puncture resistance of the top glass and entire stack. However, more specifically, comparing Stack A with Stack D it is seen that simply increasing the glass thickness in the stack is not effective. That is, Stack D (having two layers of 100 micron thick glass) had about the same puncture resistance (1.9 versus 2.4 Kgf as shown in FIG. 4) as Stack A which had only one 100 micron thick glass layer. This is due to the 50 micron thick OCA/PSA layer between glass layers in Stack D, which layer allowed flexure in the top layer, to the point of failure, before the second layer could provide any benefit. Thus, a layer between the glass having low stiffness or low modulus may push out of the way and allow the glass to undergo biaxial bending before the underlying layer provides any support. Accordingly, the glass layers in the stack need to more directly support one another (i.e., providing a greater coupling between glass layers so as to increase energy transfer/absorption from one layer to the next).

Comparing Stack D with Stack E, it is seen that more direct support of the top glass layer by an underlying glass layer can be provided by increasing the stiffness of the layer between the glass layers. More specifically, similarly to Stack D, Stack E had two 100 micron thick glass layers separated by a 50 micron thick interlayer. However, in the case of Stack E, the interlayer was Polyimide (PI) having a larger stiffness than that of the OCA/PSA in Stack D. Accordingly, the stiffer PI interlayer was able to more closely couple the glass layers so that Stack E had a puncture load of about 4.7 Kgf, i.e., higher than that of both Stack D (1.9 Kgf) and Stack A (2.4 Kgf). See, for example, FIG. 4. Although not modeled, according to the principles of the present disclosure, a thinner layer of PI in Stack D is likely to improve its puncture resistance.

Comparing Stack E with Stack C, it is seen that even more direct support of the top glass layer can be provided by a thinner interlayer. More specifically, Stack C employed an interface between glass layers as shown in FIG. 1: each glass layer 10 had an anti-frictive coating material 16 (about 2 nanometers (nm) of silane) on its surface, and material 14 (about 50 nm of mineral oil) therebetween. Stack C achieved a puncture resistance of about 6.2 Kgf, i.e., higher than that of each Stack E (4.7 Kgf), Stack D (1.9 Kgf) and Stack A (2.4 Kgf). See, for example, FIG. 4. Accordingly, a thickness of the interface 12 on the order of nm, up to a few microns, is beneficial in providing more direct support of a glass layer by an underlying glass layer. However, the puncture resistance of Stack C (6.2 Kgf) is only about half that of Stack B (12.3 Kgf), which is the 200 micron thick monolithic piece of glass. See, for example, FIG. 4.

Accordingly, it appears that when the glass thickness in a stack is separated (i.e., 200 microns monolithic piece of glass has same glass thickness as that in a stack having two 100 micron monolithic pieces of glass) into more than one layer, more glass thickness will be used to achieve a similar puncture resistance. Indeed, comparing Stack F with Stack B, it is seen that 6 layers of 100 micron thick monolithic pieces of glass can be used to achieve about the same puncture resistance as one 200 micron thick monolithic piece of glass. That is, Stack F had a puncture resistance of 12.8 Kgf, very similar to that of Stack B (12.3 Kgf). See, for example, FIG. 4.

Figure 5:
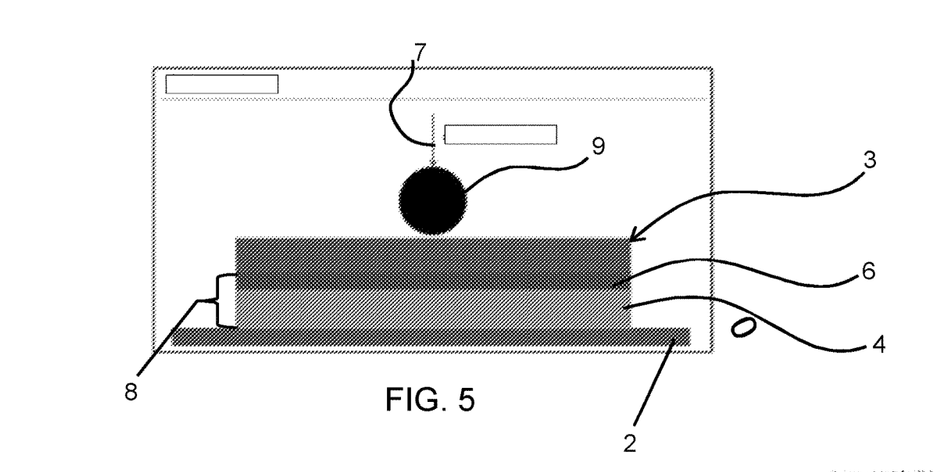
FIG. 5 is a schematic side view of a test set-up.

Various configurations of the stack 3 were then built and tested. FIG. 5 is a schematic side view of the test apparatus used for testing the puncture resistance of stacks 3. The materials underlying a cover element have an impact on flexure of the cover element and, thus, its ability to resist puncture. Accordingly, the stacks were tested with underlying materials that were chosen to mimic properties of the materials in a mobile display device underlying the cover.

The test apparatus includes a solid aluminum stage 2 on top of which there is disposed a base 8. The materials of the base 8 were chosen to have properties that mimic those in a display device underlying a cover element. More specifically, the base 8 includes a 100 micron PET layer 4, on top of which there is disposed a 50 micron PSA layer 6. Instead of a 50 micron PSA, a 50 micron thick layer of OCA may be used, as long as the OCA has similar properties as the PSA. The properties of the various materials 100 micron PET 4, 50 micron PSA/OCA 6, and glass layer 10 are shown in Table 1.

TABLE 1

| Material | Density (Kg/m$^3$) | Modulus of Elasticity (MPa) | Poisson's Ratio |
|---|---|---|---|
| Glass | 2450 | 71000 | 0.22 |
| PI | 1420 | 31000 | 0.34 |
| PET | 1038 | 1920 | 0.38 |
| OCA (PSA) | 1080 | 1 | 0.49 |

To test any particular stack 3, the stack 3 is placed on the base 8. Then, using an Instron, a tungsten carbide ball 9 having a 1 mm diameter is pressed in direction 7 onto the stack 3 at a rate of 1 mm per minute until a crack is visible on the topmost glass layer 10 in the stack, which crack indicates failure of the stack 3. The load being applied to the ball 9 at failure of the stack 3 is recorded as the puncture resistance of the stack 3.

Figure 6:
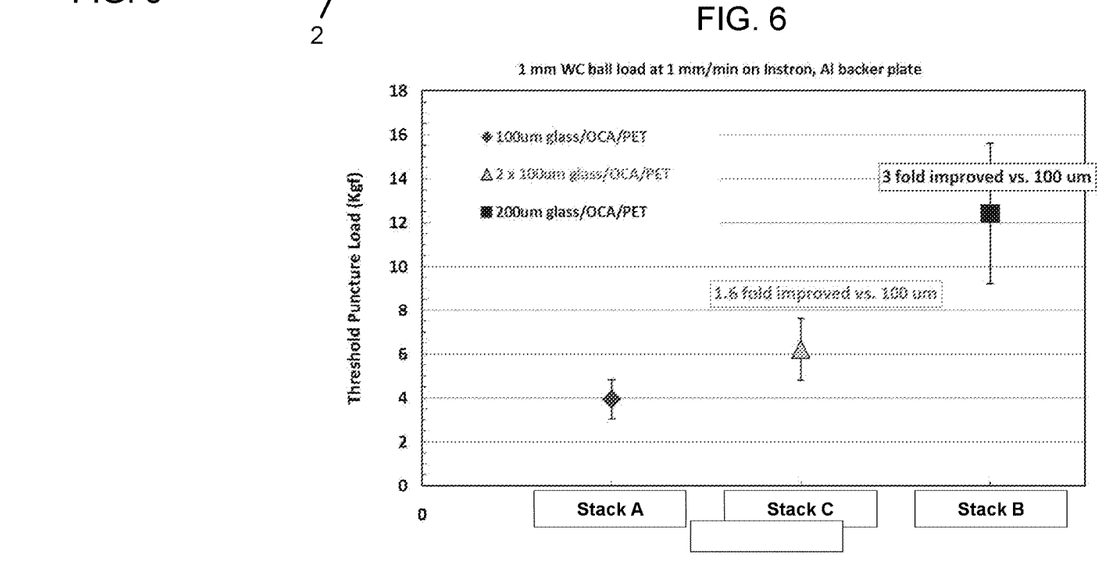
FIG. 6 is a plot of experimental results for puncture resistance testing including threshold puncture load (vertical axis in Kgf) for Stacks A-C (along the horizontal axis.

Specifically, Stacks A, C, and B, were built and tested using the apparatus of FIG. 5. The results of the testing are shown in FIG. 6 which is a plot of threshold puncture load (load at failure, in Kgf) for the configurations of Stack A, Stack B, and Stack C. For the experimental results, the glass was not ion-exchanged, or subject to the process of making as set forth in U.S. Pat. No. 9,321,677. Instead, the glass was display-grade, alkali-free, fusion down-drawn 100 micron thick glass. As is shown in FIG. 6, Stack A (having one layer of 100 micron thick glass) has a much smaller puncture threshold (4 Kgf) than does Stack B (12 Kgf) having one 200 micron thick glass layer. Using two layers of 100 micron thick glass as in Stack C can increase the puncture threshold (about 6 Kgf) relative to that in Stack A (about 4 Kgf), but does not achieve the same level as that for Stack B (about 12 Kgf). These results are very much in line with the modeling results. As noted above, though, the experimental results were performed on non-strengthened glass, whereas the modeling results were obtained with strengthened glass. However, if performed on strengthened glass, the experimental results would be expected to shift upward slightly, as the strengthening would increase the glass' ability to deflect, i.e., it could achieve a higher stress on its underside before failure. However, the strengthening, and processes set forth in U.S. Pat. No. 9,321,677, have a greater effect on the glass' ability to achieve tight bend radii, and it is in that regard that such processes would be utilized, i.e., to achieve a particular bending radius in each of the layers of glass in the stack. In any event, using two layers of 100 micron thick glass does improve, by about 1.5 to 1.6 times, the threshold puncture load that a stack can take relative to only one 100 micron thick glass layer.

The modeling results of FIGS. 3G and 4, as well as the experimental results of FIG. 6, show the ability of a stack to withstand semi-static load. That is, the tungsten carbide ball moves quite slow (at a 1 mm per minute). However, although semi-static, one would generally expect that, directionally, given the characteristics and thicknesses of materials in the stack assembly, the test is indicative of the stack's ability to absorb energy without failing. That is, a stack assembly's ability to withstand a higher static load than does another stack assembly is also generally indicative that it will withstand a higher dynamic load as well, for example the dynamic loading of other puncture resistance tests, for example pen drop testing.

From the above results, it is seen that with the appropriate coupling between glass layers, increasing the number of glass layers in a stack is able to increase the puncture resistance of a stack. According to some examples, for example comparing Stack A with Stack C and Stack F, it is seen that increasing the number of glass layers from one has a multiplying effect on the failure load. More specifically, assuming glass layers of the same thickness, increasing the number of glass layers from one (as in Stack A) to two (as in stack C) increased the failure load by more than twice, i.e., from 2.4 Kgf to 6.2 Kgf. Similarly, increasing the number of glass layers from one (as in Stack A) to six (as in stack F) increased the failure load by almost six times, i.e., from 2.4 Kgf to 12.8 Kgf.

Regarding the ability of the stack to bend, a variation of Stack F was built having three layers of 100 micron glass (wherein the glass was made according to the processes of etch, ion-exchange, and etch, as set forth in U.S. Pat. No. 9,321,677), wherein each face of a glass layer adjacent to an interface was coated with C-18 silane. The glass layers were tacked together in the area of bending (hinge area). This sample was able to survive bending between parallel plates separated at a distance of 10 mm. The parallel plate bending test was carried out for 60 minutes at 25° C. and 50% relative humidity.

According to prophetic Example, a variation of Stack F may be designed to bend to a parallel plate distance of 2 mm, and not break after 60 minutes in an environment of 25° C. and 50% relative humidity. The stack can be configured with three layers of 70 micron glass, each having a surface compressive stress of 700 MPa or more, and an interface between adjacent glass layers of 2 nm to 500 nm thick in which there is disposed an index of refraction matching material (to match with the index of refraction of the glass layers), and a coating (as described above) on each glass layer surface that defines the interface. Further, because of the multiple layers of 70 micron glass, the stack can also have a puncture resistance of greater than about 6 kgf when one outer glass layer is supported by (i) an 50 μm thick pressure-sensitive adhesive having an elastic modulus of less than 1 GPa and (ii) an approximately 100 μm thick polyethylene terephthalate layer having an elastic modulus of less than 10 GPa, and the the other outer glass layer is loaded with a tungsten carbide ball having a 1 mm diameter.

Bend Stress:

The tight bending radius will result in large tensile stresses. Due to existence of preexisting flaws on glass surfaces, glass tends to fail either in catastrophic fashion or delayed failure fashion (fatigue failure due to cyclic loading). Below equation can be used to estimate the maximum bending stress of a glass sheet due to a constant radius of curvature, $$\sigma_{max} = \frac{E}{1-v^2}\frac{h}{2}\frac{1}{R} \quad (0.1)$$

where E is the Young's modulus, v is Poisson's ratio, h is the glass thickness and R is the radius of curvature. Using this equation, we can predict the effects of modulus, glass thickness and radius of curvature on maximum tensile stress on glass due to bending, as shown in FIG. 1. Clearly, the maximum bending stress is linearly dependent on glass thickness, glass modulus and inversely proportional to the radius of curvature. Therefore, to minimize the maximum bending stresses, thinner and low modulus glass is preferred.

Due to the presence of flaws on glass surfaces (the flaws can be either introduced during manufacturing process or due to post-processing or handling process), under such tensile bending stresses, based upon the fracture mechanics, we can estimate the stress intensity factors as the flaw tip as $$K = Y\sigma\sqrt{\pi a} = \frac{YE}{1-v^2}\frac{h}{2}\frac{1}{R}\sqrt{\pi a} \quad (0.2)$$

where a is flaw size, Y is geometry factor (generally is assumed to be 1.12 for the edge crack case). This equation assumes the tensile stress along the crack face is constant, which is a reasonable assumption when the flaw size is small (less than 1 micrometer) for thin glasses.

Stress intensity factor is a quantity to quantify the flaw severity at the crack tip. When stress intensity factor $$K=K_{IC} \quad (0.3)$$

the glass will fail instantaneously. $K_{IC}$ is the fracture toughness of glass (a measurement of material property to resist crack growth), For glass the fracture toughness is generally around 0.7 MPa*m$^{0.5}$. When stress intensity factor $$K_{threshold} \leq K < K_{IC} \quad (0.4)$$

the glass will fail in slowly (in fatigue fashion due to cyclic loading or other stress driven events). $K_{threshold}$ is the critical stress intensity factor value below which fatigue failure will not happen. $K_{threshold}$ can be determined specifically based upon the life time requirements of a product through experimental characterization. Here we assume $K_{threshold}$ is approximately on the order of 0.2 MPa*m$^{0.5}$. Ideally, $K_{threshold}$ should be closely to zero or even negative (physically, negative values of stress intensity factor means the crack tip is under compressive stress state) so that fatigue failure mode can be eliminated.

Based upon previous experimental results and experience, for typical fusion formed glass surface, flaw size a can be on the order of sub-micrometers. Here we assume flaw size is 400 nm. Effects of modulus, thickness and radius of curvature on the stress intensity factors due to various radius of curvature on non-strengthened glass are shown in FIG. 2. Clearly, the higher the tensile bending stress, the larger the intensity factor. For 5 mm radius of curvature requirement, various thickness and modulus glass can be either in the instantaneous breakage regime or in the fatigue crack growth regime for non-strengthened glass. Therefore, we have to strengthen the glass to achieve the tight bending radius requirement.

Here we consider two possible strengthening mechanisms. One is the lamination strengthening due to CTE mismatch between clad and core glass and the other one the typical ion-exchange strengthening. Here we assume 150 MPa surface compression for CTE mismatch and 700 MPa surface compression for ion-exchange. The net stress due to bending and strengthening compression can be estimated as $$\sigma = \frac{E}{1-v^2}\frac{h}{2}\frac{1}{R} - CS \quad (0.5)$$

where CS is the surface compression due to strengthening. FIG. 3 shows effects of modulus, thickness and radius of curvature on the maximum tensile stresses due to 5 mm radius of curvature on strengthened glasses. Clearly with only 150 MPa surface compression it is not enough to mitigate all the tensile stresses generated by 5 mm tight bending radius. If the glass surface is under tension, then there is a possibility that the glass will fail either in instantaneous or delayed fashion due to fatigue, as shown in FIG. 4.

Based upon the net stresses estimated from equation (1.5), assume a 2 μm flaw size (which could be introduced during the customer usage), the stress intensity at the crack tip can be numerically estimated through weighting function approach by incorporating the varying stress state along the whole crack surfaces (Tada, H., P. C. Paris, and G. R. Irwin, *The Stress Analysis of Cracks Handbook.* 2000: ASM International.). This stress intensity factor estimation also includes the finite thickness of the specimen.

During bend, the layers in the stack will experience different bend radii. For example, in an in-fold bend (FIGS. 5 and 10), the outer most layers will experience larger bend radius than layers progressing toward the inner curve. Folded multilayer glass stack. Layers permanently adhered to each other will behave as a monolithic glass unit and resist bend. The layers must be allowed to slide pass each other during bend, then realign after bend. See, for example FIGS. 1 and 2 and the description above.

In Equation (1.1), R is assumed to be constant as a glass layer is bent around a hypothetical, perfectly cylindrical mandrel between two parallel plates. Without being bound by theory, those with ordinary skill would also recognize that the radius, R, can be non-constant during a bend evolution, either from an application-related bend or testing between two parallel plates. Equation (1A) below can account for these non-uniformities:

$$\sigma_{max} = 1.198\frac{E}{1-v^2}\left[\frac{t}{(D-t)}\right] \quad (1A)$$

where E is the modulus of the material in GPa, v is the Poisson's ratio of the material, t is the thickness of the material in mm, and D is the separation distance (in mm) between the parallel plates. Equation (1A) is the maximum stress in a parallel plate bend apparatus, and is different from that in Equation (1.1) because it accounts for the fact that the sample will not achieve a uniform constant bend radius (as was assumed for Equation (1.1)) in a parallel plate test apparatus, but will have a smaller minimum radius. The minimum radius (R) is defined as D−h=2.396 R, wherein h is the glass element thickness in mm and is the same as t. The minimum radius R, determined for a given plate separation can be used in Equation (1.1) to determine maximum stress. More generally, it is evident from Equations (1.1) and (1A) that maximum bending stresses are linearly dependent on the thickness of the glass layer and elastic modulus, and inversely dependent on the bend radius of curvature of the glass layer.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. For example, the various concepts disclosed herein may be combined in the following non-exhaustive list of embodiments.

Embodiment 1

A glass article, comprising:
a first glass layer;
a second glass layer disposed adjacent to the first glass layer;
an interface slidably coupling the first glass layer to the second glass layer, the interface comprising a thickness of from 2 nm to 500 nm;
the glass article characterized by: (a) an absence of failure when the article is held at a parallel plate separation distance of 10 mm for 60 minutes at 25° C. and 50% relative humidity; (b) a puncture resistance of greater than about 6 kgf when the second glass layer is supported by (i) an 50 μm thick pressure-sensitive adhesive having an elastic modulus of less than 1 GPa and (ii) an approximately 100 μm thick polyethylene terephthalate layer having an elastic modulus of less than 10 GPa, and the first glass layer is loaded with a tungsten carbide ball having a 1 mm diameter.

Embodiment 2

The glass article of embodiment 1, further comprising an index of refraction matching material disposed in the interface.

Embodiment 3

The glass article of embodiment 1 or embodiment 2, further comprising a coating on at least one of the first and second glass layers, the coating being disposed in the interface.

Embodiment 4

The glass article of embodiment 3, wherein the coating on the at least one of the first and second glass layers comprises a polyimide material.

Embodiment 5

The glass article of any one of embodiments 1-4, wherein the second glass layer is from 10 microns to 125 microns thick.

Embodiment 6

The glass article of any one of embodiments 1-5, wherein the first glass layer is from 10 microns to 125 microns thick.

Embodiment 7

The glass article of any one of embodiments 1-5, wherein the first glass layer has a larger thickness than the second glass layer.

Embodiment 8

The glass article of embodiment 7, wherein the first glass layer is from 100 microns to 125 microns thick.

Embodiment 9

The glass article of any one of embodiments 1-8, further comprising a hinge axis, and the first and second glass layers are fixed relative to one another at the hinge axis.

Embodiment 10

The glass article of any one of embodiments 1-9, further comprising a frame element disposed around the first and second glass layers.

Embodiment 11

A glass article, comprising:

a first glass layer having a thickness of from 10 microns to 70 microns;

a second glass layer disposed adjacent to the first glass layer, the second glass layer having a thickness of from 10 microns to 70 microns;

an first interface slidably coupling the first glass layer to the second glass layer, the interface comprising a thickness of from 2 nm to 500 nm;

a third glass layer disposed adjacent to the second glass layer, the third glass layer having a thickness of from 10 microns to 70 microns;

an second interface slidably coupling the second glass layer to the third glass layer, the second interface comprising a thickness of from 2 nm to 500 nm;

the glass article characterized by: (a) an absence of failure when the article is held at a parallel plate separation distance of 2 mm for 60 minutes at 25° C. and 50% relative humidity; (b) a puncture resistance of greater than about 6 kgf when the third glass layer is supported by (i) an 50 µm thick pressure-sensitive adhesive having an elastic modulus of less than 1 GPa and (ii) an approximately 100 µm thick polyethylene terephthalate layer having an elastic modulus of less than 10 GPa, and the first glass layer is loaded with a tungsten carbide ball having a 1 mm diameter.

Embodiment 12

The glass article of embodiment 11, further comprising an index of refraction matching material disposed in at least one of the first through fifth interfaces.

Embodiment 13

The glass article of embodiment 11 or embodiment 12, further comprising a coating on at least one of the first and second glass layers, the coating being disposed in the interface.

Embodiment 14

The glass article of embodiment 13, wherein the coating on the at least one of the first and second glass layers comprises a polyimide material.

Embodiment 15

The glass article of any one of embodiments 11-14, wherein the first glass layer has a larger thickness than any one of the second through sixth glass layers.

Embodiment 16

The glass article of any one of embodiments 11-15, further comprising a hinge axis, and the first and second glass layers are fixed relative to one another at the hinge axis.

Embodiment 17

The glass article of any one of embodiments 11-16, further comprising a frame element disposed around the first and second glass layers.

What is claimed is:

1. A glass article, comprising:
   a first glass layer, wherein the first glass layer is from 100 microns to 125 microns thick;
   a second glass layer disposed adjacent to the first glass layer; and
   an interface slidably coupling the first glass layer to the second glass layer, the interface comprising a thickness of from 2 nm to 500 nm,
   wherein the glass article is characterized by:
   (a) an absence of failure when the article is held at a parallel plate separation distance of 10 mm for 60 minutes at 25° C. and 50% relative humidity; and
   (b) a puncture resistance of greater than about 6 kgf when the second glass layer is supported by (i) an 50 µm thick pressure-sensitive adhesive having an elastic modulus of less than 1 GPa and (ii) an approximately 100 µm thick polyethylene terephthalate layer having an elastic modulus of less than 10 GPa, and the first glass layer is loaded with a tungsten carbide ball having a 1 mm diameter.

2. The glass article of claim 1, further comprising an index of refraction matching material disposed in the interface.

3. The glass article of claim 1, further comprising a coating on at least one of the first and second glass layers, the coating being disposed in the interface.

4. The glass article of claim 3, wherein the coating on the at least one of the first and second glass layers comprises a polyimide material.

5. The glass article of claim 1, wherein the second glass layer is from 10 microns to 125 microns thick.

6. The glass article of claim 1, wherein the first glass layer has a larger thickness than the second glass layer.

7. The glass article of claim 1, further comprising a hinge axis, and the first and second glass layers are fixed relative to one another at the hinge axis.

8. The glass article of claim 1, further comprising a frame element disposed around the first and second glass layers.

9. The glass article of claim 1, wherein the glass layers are chemically strengthened.

* * * * *